United States Patent [19]

Wohlhaupter et al.

[11] Patent Number: 5,611,651
[45] Date of Patent: Mar. 18, 1997

[54] BORING TOOL

[75] Inventors: Manfred Wohlhaupter, Neuffen; Harold Gähr, Frickenhausen; Peter Maar, Frickenhausen; Rolf Wohlhaupter-Hermann, Frickenhausen, all of Germany

[73] Assignee: Wohlhaupter GmbH, Frickenhausen, Germany

[21] Appl. No.: 436,352

[22] PCT Filed: Nov. 23, 1993

[86] PCT No.: PCT/EP93/03277

§ 371 Date: May 15, 1995

§ 102(e) Date: May 15, 1995

[87] PCT Pub. No.: WO94/13420

PCT Pub. Date: Jun. 23, 1994

[30] Foreign Application Priority Data

Dec. 14, 1992 [DE] Germany ............ 42 42 063.6

[51] Int. Cl.$^6$ .................................................. B23B 3/24
[52] U.S. Cl. ................. 408/153; 82/1.2; 82/131; 408/143; 408/147
[58] Field of Search ............... 279/129; 408/143, 408/147, 150, 151, 153, 181; 82/1.2, 1.4, 131

[56] References Cited

U.S. PATENT DOCUMENTS 4,040,315  8/1977  Bellingham .................. 82/131
4,607,549  8/1986  Krempel ..................... 82/1.2

FOREIGN PATENT DOCUMENTS 874550   4/1953   Germany ............... 408/153
3510259  9/1985   Germany .
3620696  12/1987  Germany .
3926026  2/1991   Germany .
354646   7/1961   Switzerland ........... 408/147

Primary Examiner—Steven C. Bishop
Attorney, Agent, or Firm—Shenier & O'Connor

[57] ABSTRACT

A boring tool comprises a rotating tool body, a tool slide transversely displaceable therein, a cutting plate arranged on the tool slide and a micrometer screw for adjusting the tool slide, this micrometer screw being mounted transversely to the axis of rotation of the boring tool so as to be rotatable and axially non-displaceable. The micrometer screw is mounted in the tool body at a distance from the tool slide and drives a drive slide displaceable transversely to the axis of rotation of the tool body. A transfer lever is pivotally mounted in the space between drive and tool slides and engages with one arm on the drive slide and with the other arm on the tool slide such that when the drive slide is displaced the tool slide is entrained in the opposite direction to the drive slide. The masses of drive slide, on the one hand, and tool slide, including cutting plate, on the other hand, are determined such that the entire arrangement of drive and tool slides is always balanced in relation to the axis of rotation during their movement in opposite directions.

6 Claims, 4 Drawing Sheets

BORING TOOL

The invention relates to a boring tool comprising a tool body which can be clamped into a rotatingly driven spindle and rotates with this spindle, a tool slide displaceable in a guide means in the tool body transversely to its axis of rotation, a cutting plate interchangeably attached to the tool slide for removing material, a micrometer screw for adjusting the tool slide in its guide means, this micrometer screw being mounted in the tool body transversely to its axis of rotation so as to be rotatable and axially non-displaceable, and adjustable counterbalancing masses for balancing the boring tool in relation to its axis of rotation.

A boring tool of this type is known from DE-A1-35 10 259. With this boring tool, the unbalanced masses have to be adjusted separately from the adjustment of the tool slide in order to bring about the balancing of the boring tool.

The object of the invention is to develop a boring tool of the generic type further such that the displacements of mass occurring during the radial adjustment of the tool slide are automatically counterbalanced so that no troublesome, out-of-balance forces result.

This object is accomplished in accordance with the invention in that

A) the micrometer screw (17) is mounted in the tool body (2) at a distance above the tool slide (7), leaving a space (16) free and drives a drive slide (19) displaceable in the tool body (2) transversely to its axis of rotation (B);

B) a two-armed transfer lever (22) is pivotally mounted in the space (16) between drive and tool slides (19 and 7, respectively), this lever engaging with its one arm on the drive slide (19) and with its other arm on the tool slide (7) such that when the drive slide (19) is displaced by the micrometer screw (17) the tool slide (7) is entrained in the opposite direction to the drive slide (19) in accordance with the leverage ratio of the transfer lever (22); and C) the drive slide (19) forms at the same time the adjustable counterbalancing mass, wherein this mass, on the one hand, and the mass of the tool slide (7), including cutting plate (15), on the other hand, are determined such that the entire arrangement of drive and tool slides (7, 19) is always balanced in relation to the axis of rotation (B) during their movement in opposite directions.

With a known boring tool of a different type (DE-C2-39 26 026), a lever engaging on a sleeve via a ball is pivoted by axial displacement of the sleeve and this lever, with its other end, radially adjusts a head part which is flexible in itself and, for its part, supports a boring tool. During the radial adjustment of the head part, a radial adjustment of a slide takes place at the same time in the opposite direction via an additional ball which automatically results in a compensation of imbalances.

Due to the use of a separate slide for compensating imbalances which is not connected directly to a lever but requires a separate part, namely the ball 25, for its drive, this arrangement is complicated and susceptible to failures and is not comparable to the inventive solution because, in this case, the transfer lever directly triggers not only the adjustment of the tool slide but also the compensation of imbalances by displacing the drive slide. An additional part for compensating imbalances corresponding to the ball of the known arrangement is therefore omitted in the invention.

The following description of a preferred embodiment of the invention serves to explain the invention in greater detail in conjunction with the attached drawings. In the drawings.

Figure 1:
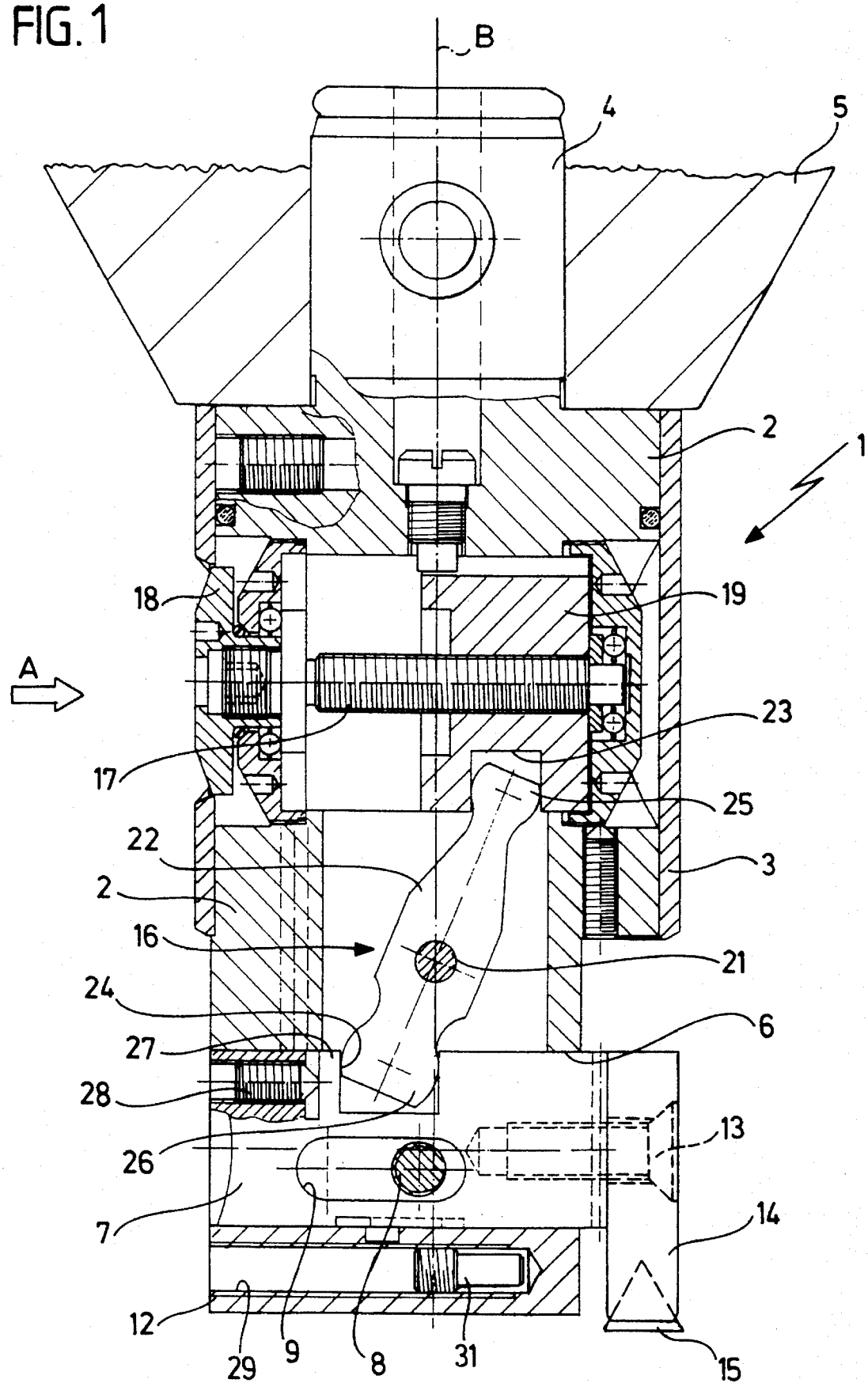
FIG. 1 is a schematic view of an axial section of a boring tool.

The boring tool 1 illustrated in the drawings comprises an essentially circular-cylindrical tool body 2 which is outwardly enclosed by a sleeve 3, preferably consisting of a chrome alloy. The tool body 2 has a shaft 4 projecting in one piece which can be clamped, e.g. by means of a chuck, into a rotatingly driven spindle 5 of a machine tool so that the boring tool 1 rotates about a common axis of rotation B together with the spindle 5.

Figure 2:
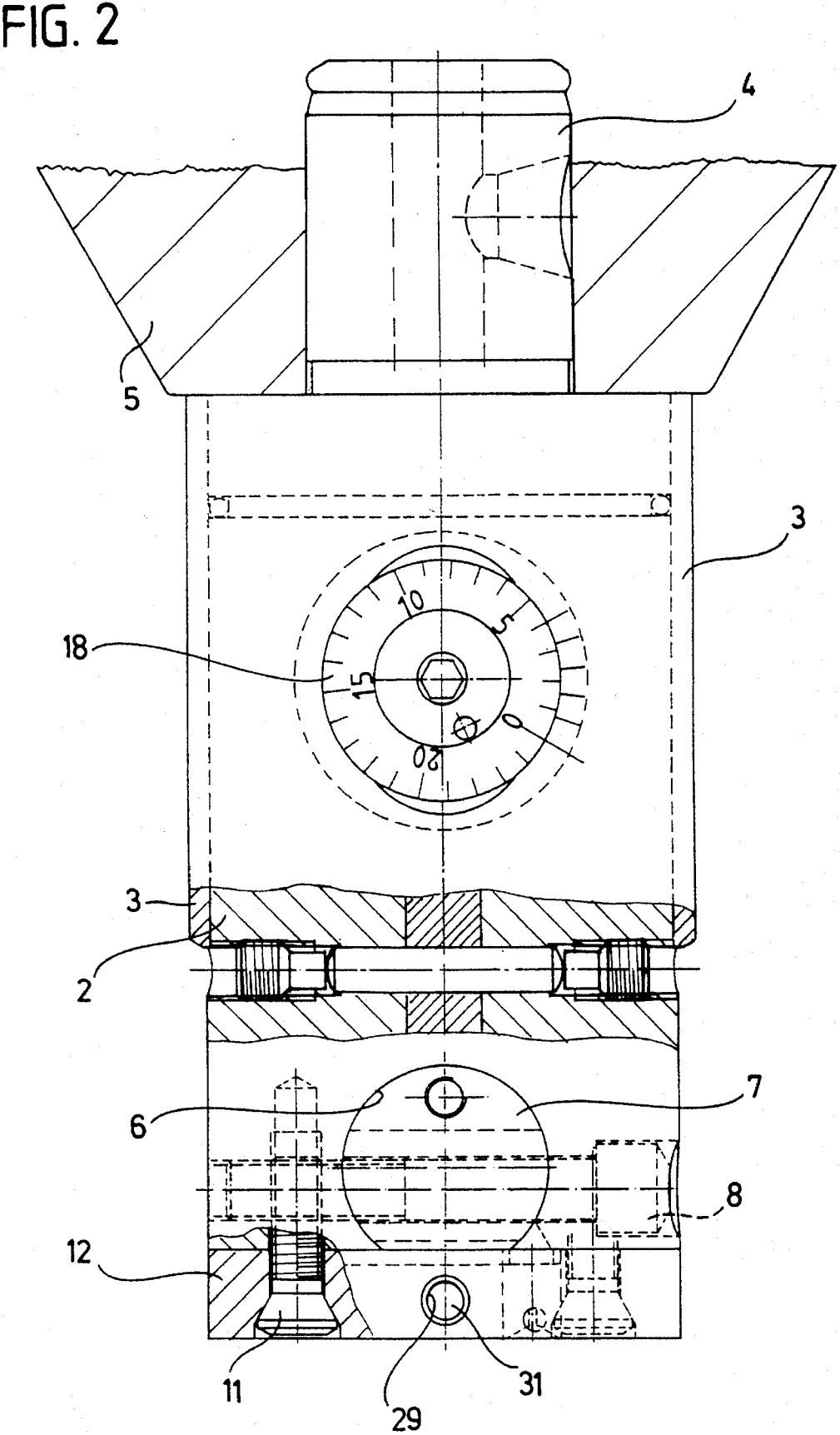
FIG. 2 is a partially cutaway side view of the boring tool in the direction of arrow A in FIG. 1.

A radially displaceable tool slide 7 is inserted into a recess 6 extending transversely to the axis of rotation B in the lower region of the tool body 2. A screw bolt 8 which penetrates a recess 9 of the tool slide 7 serves to clamp and fix the tool slide 7 in its set position. The complementary cross-sectional shapes of the recess 6 and the tool slide 7 are apparent from FIG. 2, according to which the essentially circular-cylindrical tool slide 7 is flattened on its underside. A flat cover 12 connected to the tool body 2 by screws 11 abuts on this flat underside and thereby secures the tool slide 7 against rotation.

A cutting plate carrier 14 is held by means of a screw 13 on the one side of the tool slide 7 (located to the right in FIGS. 1 and 3) and a cutting plate 15 serving to remove material from a workpiece is interchangeably secured in this carrier in a manner known per se. Corresponding boring or internal turning radii can be set by radially adjusting the tool slide 7 and, therefore, the cutting plate 15.

The tool slide 7 is radially adjusted with the aid of a micrometer screw 17 which is arranged in the tool body 2 at a distance above the tool slide 7, leaving a space 16 free inbetween, and which is mounted in the tool body 2 transversely to the axis of rotation B of the boring tool so as to be rotatable but axially non-displaceable. The micrometer screw 17 has on its one side (located to the left in FIG. 1) a head 18 with a regular scale and a vernier scale (FIG. 2), with which the micrometer screw 17 can be finely adjusted. The shaft of the micrometer screw 17 which is provided with an external thread engages in a threaded bore of a drive slide 19 which is guided in the tool body 2 so as to be non-rotatable but axially displaceable so that when the micrometer screw 17 is rotated the drive slide 19 performs a lifting or shifting movement which is directed radially transversely to the axis of rotation B and is limited on both sides.

A two-armed transfer lever 22 is mounted in the space 16 between the tool slide 7 and the drive slide 19 by means of an axle 21 supported on the tool body 2. The transfer lever 22 engages with its one arm (upper arm in FIG. 1) in a groove 23 of the drive slide 19 and with its other arm in a groove 24 of the tool slide 7. Since the axle 21 is arranged between the tool slide and the drive slide 19 so as to extend transversely to their directions of displacement, when the drive slide 19 is displaced the tool slide 7 is taken along in accordance with the leverage ratio of the transfer lever 22, namely in the opposite direction to the drive slide. In this way, the tool slide 7 is finely adjusted by rotation of the micrometer screw 17.

The leverage ratio of the transfer lever 22 can as such be freely selected. In the illustrated embodiment, the arm of this lever engaging on the drive slide 19 is longer than the arm engaging on the tool slide 7 and so a reduction ratio exists between the displacement movements of the slides 7, 19 in such a way that a bigger displacement of the drive slide 19 triggers a smaller displacement of the tool slide 7 which is favorable for a fine adjustment of the tool slide 7.

As illustrated, the arms of the transfer lever 22 each have at their ends a cylindrically ground head 25 and 26, respectively. The cylindrical head 25 fits exactly into the groove 23 of the drive slide 19. The groove 24 of the tool slide 7 is limited on one side by a freely projecting, web-like groove wall 27 which is engaged by a screw 28 accessible from the outer side of the boring tool 1. By turning the screw 28 inwards accordingly, the web 27 can be deformed such that it abuts fittingly on the cylindrical head 26 of the transfer lever 22 and so a clearance-free connection is ensured between the slides 7, 19, on the one hand, and the transfer lever 22, on the other hand.

During the production of the tool slide 7, including cutting plate carrier 14 and cutting plate 15, as well as of the drive slide 19, their masses are determined and adapted to one another such that the entire arrangement of drive and tool slides, including transfer lever 22, is always balanced in relation to the axis of rotation B during the movement in opposite directions of the two slides 7 and 19. Due to the movement in opposite directions of the two slides 7 and 19, the masses displaced radially in opposite directions counterbalance one another so that no imbalance can occur at the boring tool 1 in any position of the cutting plate 15.

As is apparent from FIG. 1, the cover 12 closing the boring tool 1 at the bottom contains a threaded bore 29 which extends essentially parallel to the direction of movement of the slides 7 and 19. A screw 31 is radially adjustable in this bore. The screw 31 serves as an additional, adjustable balancing weight and can, for example, be used to compensate for any imbalance of the masses of different cutting plates 15 and/or cutting plate carriers 14.

Figure 3:
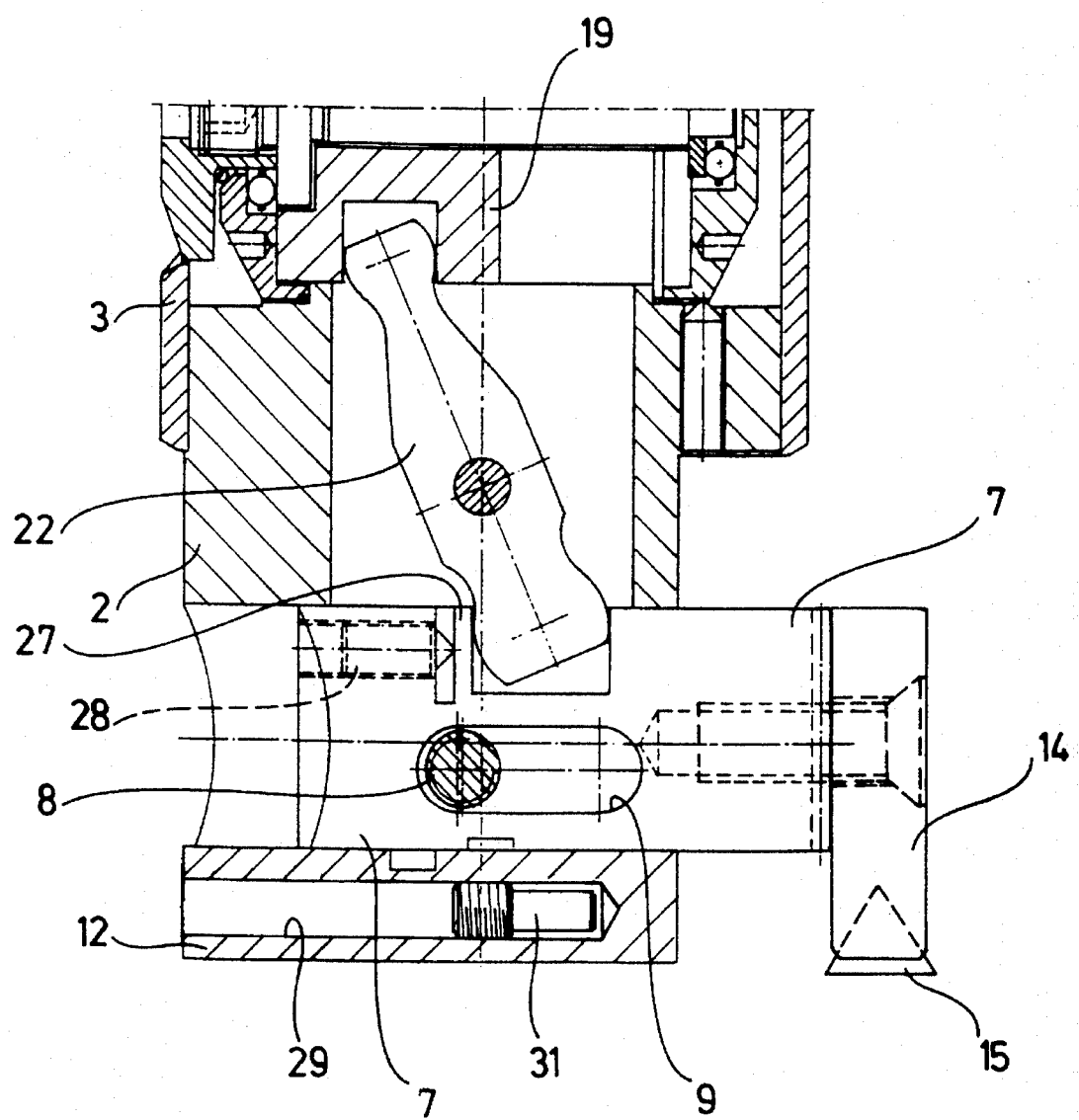
FIG. 3 is a part-sectional view similar to FIG. 1 with a tool slide in a different position and FIG. 4 is a bottom view of a cover for the boring tool from FIGS. 1 to 3.
Figure 4:
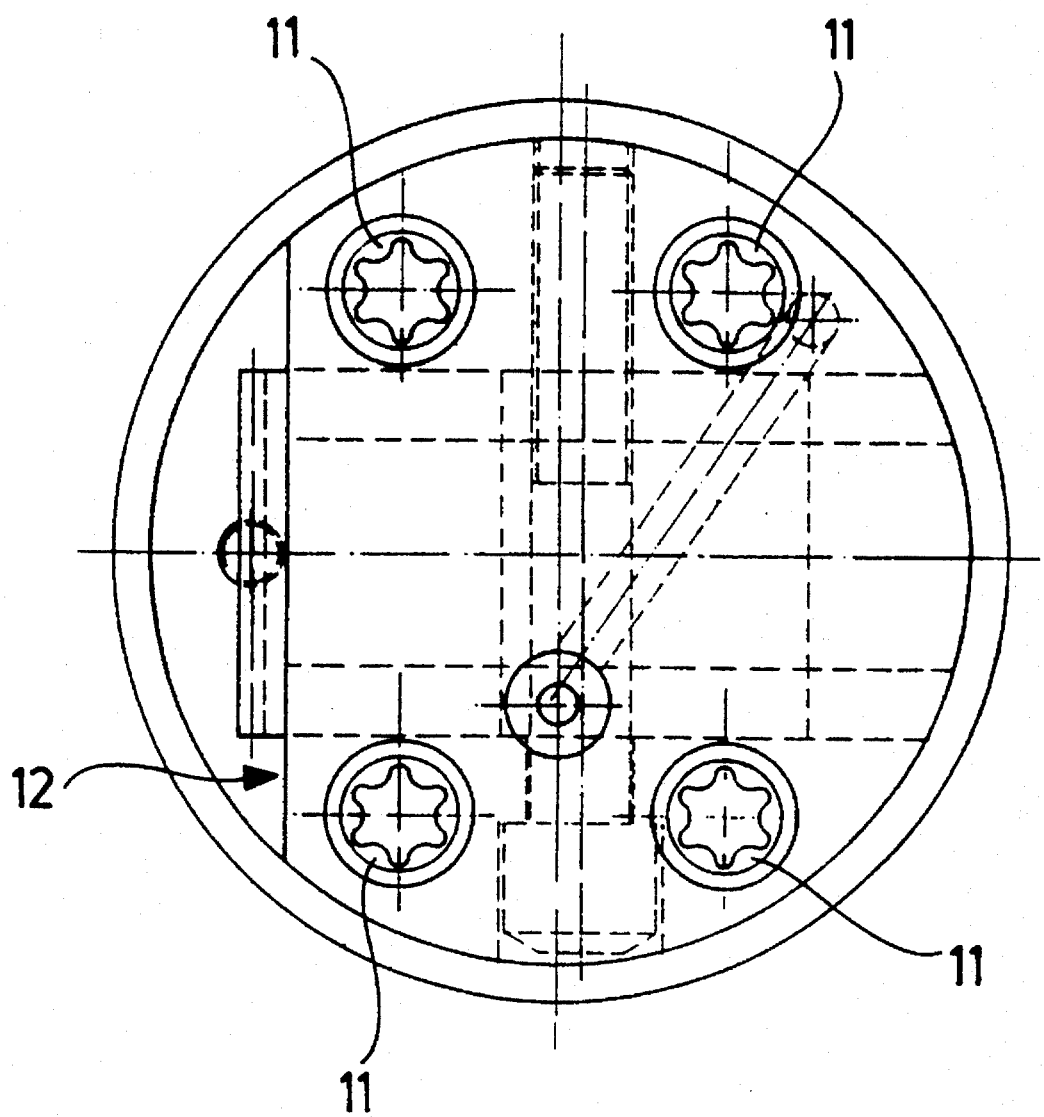

FIG. 1 shows the tool slide 7 essentially in its one (left) extreme position while this slide is illustrated in FIG. 3 in its other (right) extreme position. In these two extreme positions of the tool slide 7, the drive slide 19 connected thereto by the transfer lever 22 is located each time in a diagonally opposed position.

We claim:

1. Boring tool comprising a tool body adapted to be clamped into a rotatingly driven spindle and rotating with said spindle, a tool slide displaceable in a guide means in the tool body transversely to its axis of rotation, a cutting plate interchangeably attached to the tool slide for removing material, a micrometer screw for adjusting the tool slide in its guide means, said micrometer screw being mounted in the tool body transversely to its axis of rotation so as to be rotatable and axially non-displaceable, and adjustable counterbalancing masses for balancing the boring tool in relation to its axis of rotation, characterized in that A) the micrometer screw (17) is mounted in the tool body (2) at a distance above the tool slide (7), leaving a space (16) free and drives a drive slide (19) displaceable in the tool body (2) transversely to its axis of rotation (B);

B) a two-armed transfer lever (22) is pivotally mounted in the space (16) between said drive and tool slides (19 and 7, respectively), said lever engaging with one arm on the drive slide (19) and with its other arm on the tool slide (7) such that when the drive slide (19) is displaced by the micrometer screw (17) the tool slide (7) is entrained in the opposite direction to the drive slide (19) in accordance with the leverage ratio of the transfer lever (22); and C) the drive slide (19) forms at the same time the adjustable counterbalancing mass, wherein this mass, on the one hand, and the mass of the tool slide (7), including cutting plate (15), on the other hand, are determined such that the entire arrangement of drive and tool slides (7, 19) is always balanced in relation to the axis of rotation (B) during their movement in opposite directions.

2. Boring tool as defined in claim 1, characterized in that the drive slide (19) and the tool slide (7) each have a groove (23 and 24, respectively), one arm of the transfer lever (22) engaging in each of said grooves with a cylindrical head (25 and 26, respectively).

3. Boring tool as defined in claim 2, characterized in that the groove (24) in at least one of the slides (7, 19) has a web-like groove wall (27) adapted to be pressed by a screw (28) towards the head (26) of the transfer lever (22).

4. Boring tool as defined in claim 1, characterized in that the transfer lever (22) reduces the displacement movement of the tool slide (7) relative to the drive slide (19).

5. Boring tool as defined in claim 1, characterized in that a cover (12) is connectable to the tool body (2), said cover containing an additional, adjustable balancing weight (31) for counterbalancing the weights of different cutting plates (15).

6. Boring tool as defined in claim 5, characterized in that the cover (12) is attached to the tool body (2) beneath the tool slide (7) and secures this slide against rotation.

* * * * *